Sept. 6, 1966    J. R. AUER    3,270,915
DISPENSING MEANS FOR PHARMACEUTICAL TABLETS
Filed Feb. 3, 1965    3 Sheets-Sheet 3
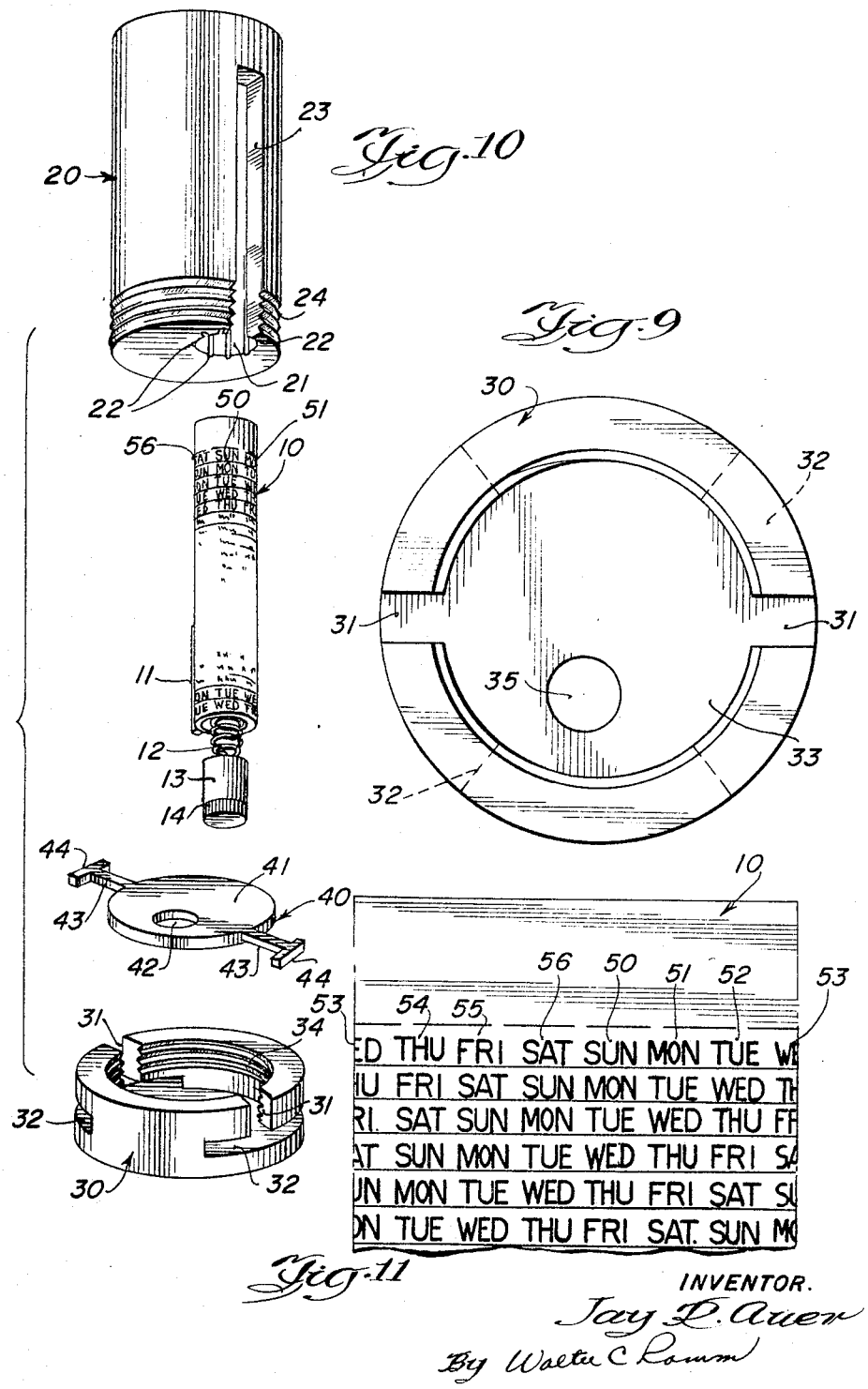
INVENTOR.
Jay R. Auer
By Walter C. Ramm
ATTORNEY United States Patent Office 3,270,915
Patented Sept. 6, 1966

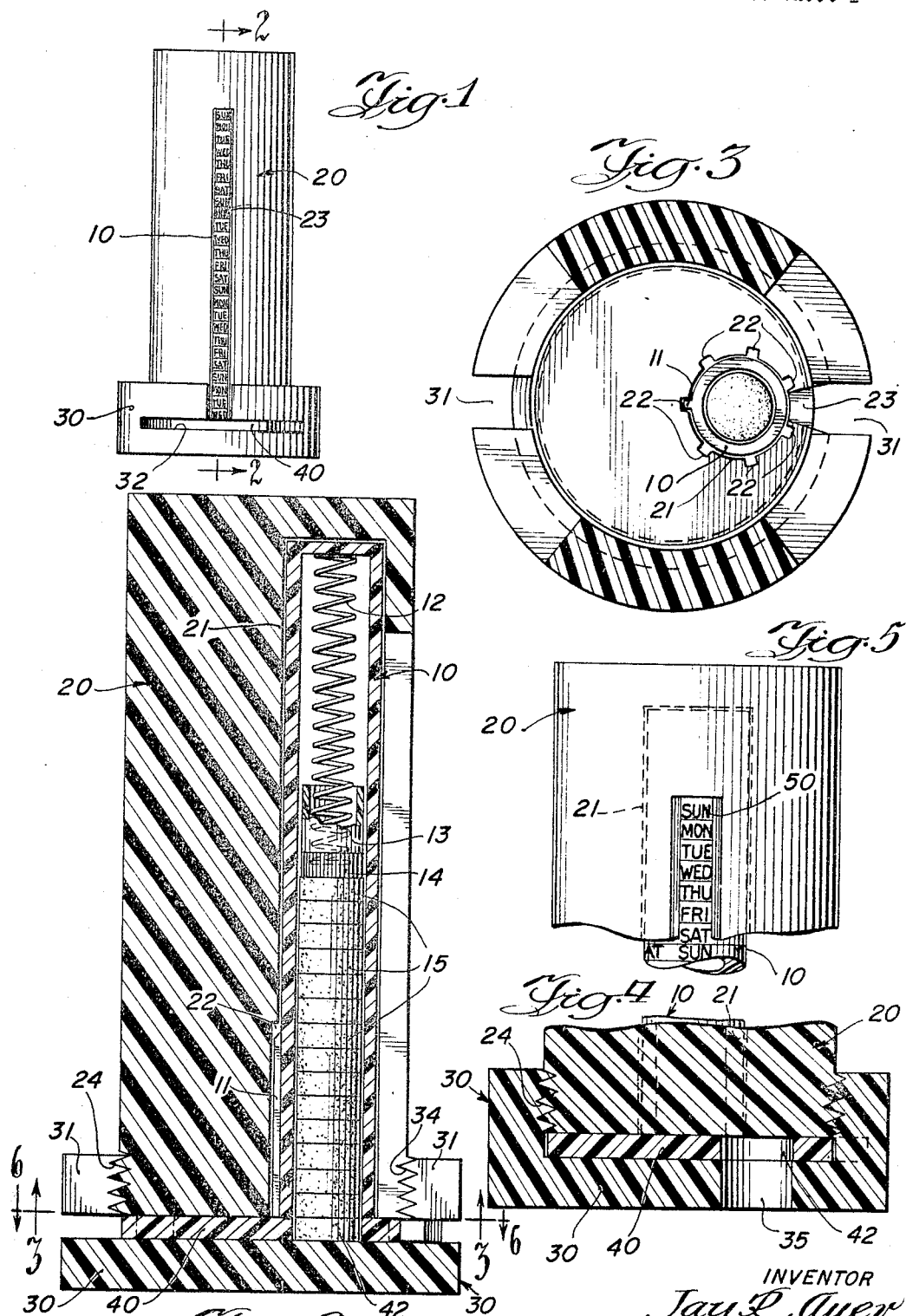

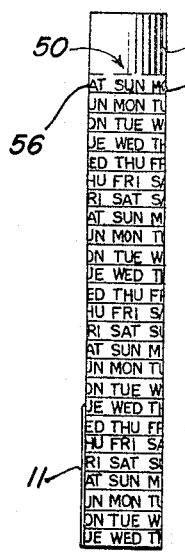
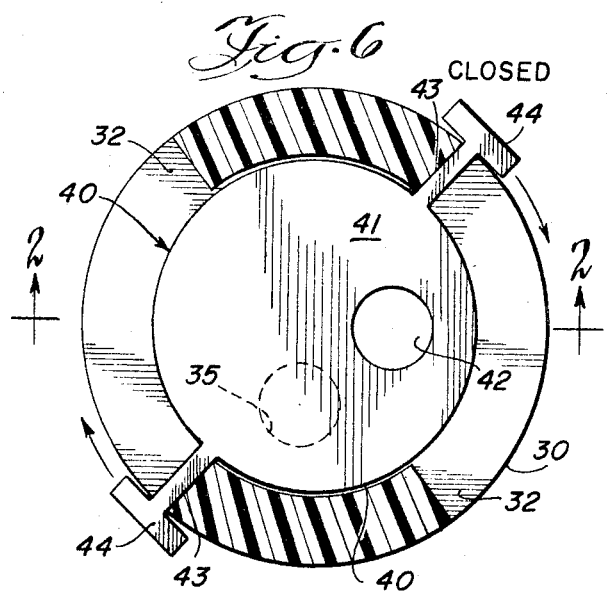
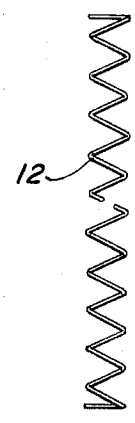
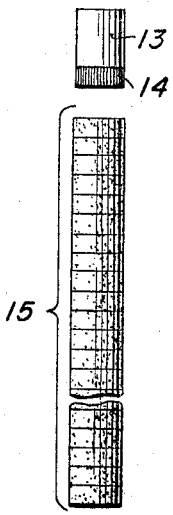
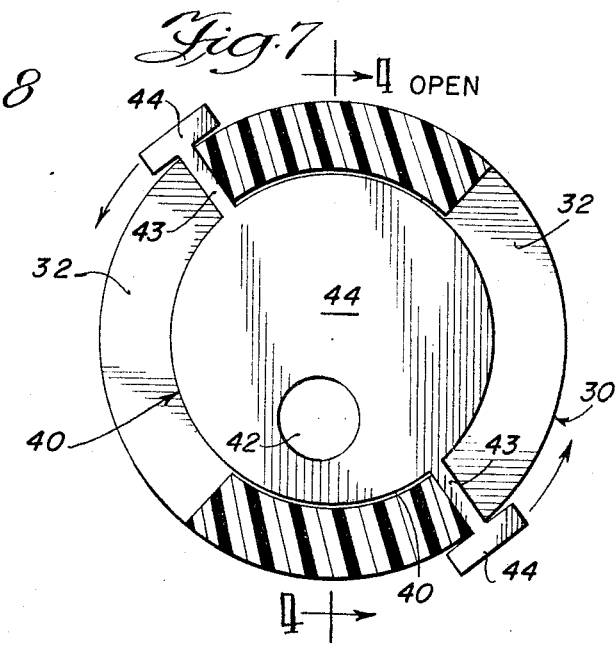

3,270,915
DISPENSING MEANS FOR PHARMACEUTICAL TABLETS
Jay Ronald Auer, Glenview, Ill., assignor to G. D. Searle & Co., Chicago, Ill., a corporation of Delaware
Filed Feb. 3, 1965, Ser. No. 430,022
5 Claims. (Cl. 221—2)

This invention relates to dispensing means for pharmaceutical preparations in solid-form dosage units, such as tablets, and, more particularly, to a device wherein a course of such dosage units is carried in a stacked manner and wherefrom such dosage units may be dispensed at time-spaced intervals in accordance with a prescribed program.

As is well known, certain pharmaceutical preparations are prescribed or recommended to be used on definite dosage schedules over relatively lengthy time periods but at relatively infrequent intervals, and a patient's adherence to such a dosage schedule is a matter of high importance. However, a patient may experience uncertainty, confusion or other difficulty in knowing and remembering when a particular dosage unit is to be used or when a particular course of dosage units is to begin. For example, under a regime calling for the total of twenty tablets at the rate of one tablet per day beginning five days after an anticipated but presently indeterminate event, many patients may be apt not accurately to remember when the first tablet is to be used and, further, whether on any particular day during the twenty a tablet was used or omitted. In such a situation, a patient unintentionally may fail seasonably to begin the course of tablets and, during the twenty days, may skip a tablet on one or more days or, conversely, may use more than one tablet on a single day. Departures of this character from the prescribed program are likely to defeat or impair the purpose for which the tablets are used, and such departures also are uneconomic. With the present invention, the possibility of these sorts of departures from a prescribed program may substantially be obviated.

An object of the present invention is to provide a device wherefrom pharmaceutical preparations in solid-form dosage units may be conveniently and safely dispensed and which concomitantly affords a graphic, readily comprehensible, and current schedule for the time-spaced administration of such dosage units. The invention serves both reminding and record-making functions, and enables patients easily and with confidence to follow and adhere to a prescribed dosage schedule.

Another object of the invention is to afford a reusable structure for the programmed dispensing of pharmaceutical tablets. Although, as hereinafter appears, certain elements of the invention may be capable of economic replacement after one cycle of use, other portions are very well adapted to repeated use, thus promoting the economy of its utilization.

A further object of the invention is to provide a convenient and readily portable device for packaging, distributing and carrying a course of solid form dosage units, minimizing the physical manipulation of such dosage units and thus preserving their physical integrity and protecting them from other possible hazards that attend undue manipulation.

The invention is well adapted to the programmed dispensing of oral contraceptive drugs in tablet form, because, with such drugs, the careful adherence to a dosage schedule of tablets and, in some instances, a particular sequence of tablets, is a paramount concern. However, the adaptability of the invention is in no wise limited to such particular field.

The invention is explained in the following description and illustrated in the accompanying drawings.

Referring to the drawings:

FIG. 1 is an elevation showing a fully assembled device, including outer container, closure, gate and, through the slot of the outer container, the magazine therein.

FIG. 2 is a longitudinal sectional elevation of the device as along 2—2 of FIG. 6.

FIG. 3 is an inverted plan view, along 3—3 of FIG. 2 showing the outer container, the magazine and a portion of the closure.

FIG. 4 is a sectional elevation of the closure and gate, along 4—4 of FIG. 7, showing also a portion of the outer container.

FIG. 5 is an elevation showing the upport portion of the outer container and the magazine therein.

FIG. 6 is a sectional plan view, along 6—6 of FIG. 2 showing the closure and the gate in the "closed" position.

FIG. 7 is a sectional plan view showing the same closure and gate of FIG. 6 but with the gate in the "open" position.

FIG. 8 is an exploded view showing the transparent magazine, and the spring, indicator-piston and tablets therein to be contained.

FIG. 9 is a plan view of the closure.

FIG. 10 is an exploded view showing the outer container; the magazine, with spring and indicator-piston; gate, and closure.

FIG. 11 is a developed view of the magazine showing the sequence-of-day indicia thereon.

In the drawings numeral 10 is a cylindrical, transparent magazine; numeral 11 is a ridge on the outer wall of magazine 10; numeral 12 is a constant- and low-tension spring; numeral 13 is an indicator piston; numeral 14 shows a band of contrasting color on indicator piston 13; numeral 15 is a stack of pharmaceutical tablets; numeral 20 is an outer container; numeral 21 is a cylindrical cavity within outer container 20, such interior cavity having its principal axis parallel with the principal axis of, but being eccentric within, outer container 20; numeral 22 represents each of seven equidistantly-spaced longitudinal grooves in the wall of cavity 21; numeral 23 is a longitudinal slot in outer container 20; numeral 24 shows exterior screw threads on outer container 20; numeral 30 is a closure; numeral 31 represents each of two lateral interruptions in closure 30; numeral 32 represents each of two transverse interruptions in closure 30; numeral 33 is inner recess in closure 30; numeral 35 is an aperture in closure 30; numeral 40 is a gate; numeral 41 is the disc portion of gate 40; numeral 42 is an aperture in disc portion 41; numeral 43 represents each of two arm portions of gate 40; numeral 44 is a lug at the extremity of each arm portion 43; numerals 50, 51, 52, 53, 54, 55 and 56 respectively, refer to each of seven discrete columns of uniformly-spaced sequence-of-day indicia on magazine 10, each such column commencing with a different day of the week.

The following details and describes the manner in which the invention is utilized in a particular embodiment thereof designed to dispense pharmaceutical tablets at the rate of one per day. Preliminarily, gate 40 is assembled with closure 30, such assembly being accomplished by inserting the arm portions 43 in lateral interruptions 31 and seating each arm portions 43 so that gate 40 is enabled to move angularly in inner recess 33 and in the plan defined by transverse interruptions 32.

Magazine 10 is loaded by placing therein indicator-piston 13 and tablet stack 15 so that one end of the tablet stack 15 is at the open end of magazine 10, as shown in FIG. 8 and FIG. 2. Also as shown in FIG. 8, optionally and preferably, piston 13 may be adapted positively to exert force toward the open end of magazine 10, as by a constant- and low-tension spring 12. Notice should be taken that this force need not be a heavy one; in some instances, magazine 10 being held in a vertical aspect with indicator-piston 13 atop the tablet stack 15, the gravitational effect may suffice to urge the tablets toward the open end of magazine 10. The tablets of tablet stack 15 are of uniform thickness, and in this dimension each tablet is equal to the interval defining one day in the sequence of day indicia, such as 50, on magazine 10, and each tablet in the stack is positioned to correspond with an interval defining one day. Also, the diameter of the chamber of magazine 10 is only very slightly larger than the diameter of the tablets of tablet stack 15 so that, in the chamber, the tablets are readily retained in a stacked relationship. Loading of magazine 10 in this manner may be accomplished by the ultimate user of the device, or it may be done before hand, and the pre-loaded magazine furnished to the ultimate user.

The ultimate user selects the appropriate column of sequence-of-day indicia on magazine 10, according to the day the first tablet is to be dispensed. For example, if the first tablet is to be dispensed on a Friday, the user selects that column of sequence-of-day indicia which denotes Friday as being the first day on which a tablet is to be dispensed. Then, magazine 10 is inserted in cavity 21 of outer container 20 so that the selected column of sequence-of-day indicia is visible through slot 23. Magazine 10 being transparent, substantial longitudinal portions of tablet stack 15 and indicator-piston 13 are also visible through slot 23. With such insertion of magazine 10 into cavity 21 external ridge 11 engages the appropriate one of the seven grooves 22 and such engagement restrains magazine 10 from rotational movement.

Next, closure 30 and outer container 20 are connected, as at screw threadings 24 and 34, and, as so connected, slot 23 and one lateral interruption may be arranged to coincide, thus assuring that the entire selected column of sequence-of-day indicia remains visible. Also, as so connected, a surface of disc portion 41 of gate 40 abuts the open end of magazine 10 and (when the device is in an upright position) the lowermost tablet of stack 15. When the user, on the appropriate preselected first day, desires to dispense the first tablet of the course, gate 40 is rotated, by lugs 44, to bring aperture 42 into registration with the open end of magazine 10. With gate 40 so positioned, the lowermost tablet of stack 15 is urged, through the effect of indicator-piston 13, into aperture 42. Gate 40 then is counter-rotated to bring aperture 42 and the therewithin contained tablet into registration with aperture 35 of closure 30, and through aperture 35 such tablet is released from the device. Appropriate degrees of rotation and counter rotation for gate 40 can be guided and assured by the lengths of transverse interruptions 32. Inasmuch as aperture 42 conforms closely in size with each tablet, rotation of gate 40 is not interfered with by any other tablets of stack 15, or otherwise. As the lowermost tablet of stack 15 enters aperture 42, again through the effect of piston 13 and remaining tablets of stack 15 displace visibly in magazine 10 through the distance denoting one day and assume a new position. This sequence is repeated each day throughout the course of tablets.

Within magazine 10 indicator-piston 13 may be adapted so that either the uppermost tablet of stack 15, after a tablet has been dispensed on any particular day, shows the name of the next-following day when the next (and lowermost) tablet is to be dispensed from the invention, or the lower edge of indicator-piston 13 itself demarks the name of such next-following day on which a tablet is to be dispensed; for this latter purpose, a contrasting color band 14, equivalent in height to the distance defining one day may be provided at one end of indicator-piston 13.

In connection with some particular applications of the invention the user may have to establish a calendrical datum or reference day for the commencement of a course of tablets. In the specific instance of oral contraceptive tablets, this reference day is likely to be a first day of menstrual or cyclic bleeding, and, typically, the first tablet is to be taken on the fourth day following such reference day. Thus, the ultimate user inserts magazine 10 into cavity 21 so that the column of day names beginning with the first day of menstrual or cyclic bleeding appears through slot 23, and, for this particular instance, indicator-piston 13 can advantageously be dimensioned to have a height equivalent to the distance demarking five days in a column of day names on magazine 10.

When the last tablet has been dispensed and magazine 10 is empty, closure member 30 is demounted from outer container 20 and empty magazine 10 is withdrawn for refilling or replacement prior to commencement of the next course of tablets.

A number of different specific embodiments of the invention may be employed without departing from the spirit and scope thereof. For example, in lieu of a cylindrical magazine and the ridge-and-groove arrangement that such conformation requires, the magazine may be of heptagonal external cross section with the interior cavity of the outer container of conforming shape. Likewise, the chamber of the magazine need not be cylindrical but may be of interior conformation adapted to accommodate tablets of any given shape in a stacked relationship.

What is claimed is:

1. A device for the programmed dispensing of pharmaceutical tablets comprising, in combination,
    (a) an elongate, transparent magazine having a chamber and an open end;
    (b) a plurality of discrete series of indicia of periodicity on the magazine and characterized by uniformly-spaced intervals defining each of a series of indicated periods;
    (c) external reference means selectively positionable about the magazine to enable reference selectively to be made and maintained in respect of one series of indicia;
    (d) a base member mounted on the external reference means;
    (e) a metering gate in the base member covering the open end of the magazine; and,
    (f) a resiliently mounted piston within the chamber of the magazine exerting force toward the metering gate so that, when reference is made in respect of one series of indicia of periodicity and when a number of pharmaceutical tablets are within the chamber of the magazine intermediate the piston and the metering gate, the transport of one such tablet across the metering gate will cause the piston and the remaining tablets visibly to displace toward the metering gate.

2. A device for the programmed dispensing of a course of uniformly-sized pharmaceutical tablets comprising, in combination
    (a) an elognate transparent magazine having a chamber contoured to hold a number of pharmaceutical tablets in abutting relationship and a route of access thereto;
    (b) a plurality of discrete series of indicia of periodicity on the magazine characterized by uniformly spaced intervals, each interval defining an indicated period and being equivalent to the maximum thickness of one pharmaceutical tablet;
    (c) an external indicator selectively positionable about the magazine to enable visual reference to be made and maintained in respect of one pre-selected series of indicia;
    (d) a base member connected with the external indicator;
    (e) a metering device in the base member conjoined with the route of access to the chamber of the magazine, such device arranged to move between distinct "open" and "closed" positions; and, (f) a resiliently mounted piston within the chamber of the magazine exerting force toward the metering device so that, after visual reference is established to one series of indicia of periodicity, and when a number of pharmaceutical tablets are in abutting relationship within the chamber of the magazine intermediate the piston and the metering device, one cycle of movement of the metering device and the concomitant release of one tablet will cause the piston and any remaining tablets visibly to displace toward the metering device through the interval defining one indicated period.

3. A device for the programmed dispensing of a course of uniformly-sized pharmaceutical tablets comprising, in combination,
   (a) a cylindrical, transparent magazine including an external longitudinal ridge, and having a chamber contoured to hold a number of pharmaceutical tablets of uniform maximum thickness in an abutting relationship therewithin and a route of access thereto;
   (b) seven indicia, equidistantly spaced and columnarly arranged on the magazine, denoting, respectively, series of days, each indicia beginning with a different day of the week;
   (c) a base adapted to be mounted on the magazine;
   (d) an outer container adapted to receive the magazine and to be connected to the base and having a cylindrical cavity and, in the wall thereof, seven longitudinal equidistantly spaced grooves, and having also a longitudinal slot wherethrough, depending upon which groove has received the external ridge of the magazine, one selected series of day notations may be viewed;
   (e) a metering device in the base conjoined with the route of access to the chamber of the magazine, such device adapted to operate between distinct "open" and "closed" positions; and,
   (f) a spring-loaded piston of height equivalent to an integral number of days according to the scale of the indicia on the magazine, such piston within the chamber of the magazine exerting force toward the metering device so that, after visual reference is established to one indicia of periodicity, and when a number of pharmaceutical tablets are in abutting relationship within the chamber of the magazine intermediate the piston and the metering device, one cycle of operation of the metering device and the concomitant release of one tablet will cause the piston and any remaining tablets visibly to displace through the interval defining one day.

4. A device for the programmed dispensing of pharmaceutical tablets comprising, in combination
   (a) an elongate magazine having a chamber, the contents whereof may be viewed through the wall thereof, and an open end;
   (b) discrete series of indicia of periodicity on the magazine;
   (c) external reference means held about the magazine and being selectively positionable to establish and maintain reference to one of the series of indicia on the magazine;
   (d) a gate conjoined to the open end of the magazine, and,
   (e) a piston within the chamber of the magazine adapted to exert force toward the gate so that, when visual reference is established to one series of indicia of periodicity and when a number of pharmaceutical tablets are within the chamber of the magazine intermediate the piston and the gate, the transport of one such tablet across the gate causes the piston and any remaining tablets visibly to displace toward the gate.

5. A device for the programmed dispensing of a course of uniformly-shaped pharmaceutical tablets comprising in combination
   (a) an elongate transparent magazine having a chamber contoured to hold a number of pharmaceutical tablets in an abutting relationship and a route of access thereto;
   (b) a plurality of discrete series of indicia of periodicity on the magazine and characterized by uniformly spaced intervals, each interval defining an indicated period and being equivalent to the maximum thickness of one pharmaceutical tablet;
   (c) an outer container having a cavity adapted to receive the magazine in any one of a selected plurality of positions and providing means to restrain the magazine from angular movement away from a selected position within the cavity, and having also a longitudinal slot communicating to the cavity through which a selected series of indicia on the magazine may be viewed;
   (d) a base mounted on the outer container proximate the portion thereof defining the opening to the cavity therein;
   (e) a metering gate, in the base, conjoined to the route of access to the magazine; and,
   (f) a piston adapted to exert force toward the metering gate so that when a number of pharmaceutical tablets having a uniform maximum thickness equivalent to the interval defining each period are in abutting relationship within the chamber of the magazine intermediate the piston and the metering gate, the transport of one such tablet across the metering gate will cause the piston and any remaining tablets visibly to displace through an interval defining one indicated period with reference to the selected indicia of periodicity.

References Cited by the Examiner

UNITED STATES PATENTS

| | | | |
|---|---|---|---|
| 997,902 | 7/1911 | Casaretti | 221—265 |
| 1,197,577 | 9/1916 | Gove et al. | |
| 2,204,821 | 6/1940 | Priddy | 221—301 X |
| 2,577,344 | 12/1951 | Masure | 221—2 |
| 3,115,992 | 12/1963 | Menolasino et al. | 221—264 |
| 3,138,165 | 6/1964 | Erickson et al. | 221—198 X |
| 3,143,207 | 8/1964 | Wagner | 206—42 |
| 3,176,696 | 4/1965 | Stevens | 221—6 X |
| 3,199,489 | 8/1965 | Ruoss et al. | 206—42 X |

OTHER REFERENCES

German printed application of Grebasch, 1,004,772, printed March 21, 1957, (Kl. 30g, 6/02).

ROBERT B. REEVES, *Primary Examiner.*

KENNETH N. LEIMER, *Examiner.*